(12) United States Patent
Kobayashi et al.

(10) Patent No.: US 6,874,231 B2
(45) Date of Patent: Apr. 5, 2005

(54) METHOD OF MANUFACTURING A RIGID INTERNAL GEAR OF A WAVE GEAR DEVICE

(75) Inventors: Masaru Kobayashi, Nagano-ken (JP); Yoshihiro Tanioka, Nagano-ken (JP)

(73) Assignees: Harmonic Drive Systems Inc., Tokyo (JP); Harmonic Drive Aktiengesellschaft, Limburg Ad Lahn (DE)

( * ) Notice: Subject to any disclaimer, the term of this patent is extended or adjusted under 35 U.S.C. 154(b) by 0 days.

(21) Appl. No.: 10/617,044

(22) Filed: Jul. 11, 2003

(65) Prior Publication Data

US 2004/0103537 A1 Jun. 3, 2004

Related U.S. Application Data

(62) Division of application No. 10/117,993, filed on Apr. 9, 2002, now abandoned.

(30) Foreign Application Priority Data

Apr. 9, 2001 (JP) ........................................ 2001-109759

(51) Int. Cl.[7] ........................... B21D 53/28; F16H 33/00
(52) U.S. Cl. ....................... 29/893.1; 29/893.37; 74/640
(58) Field of Search ...................... 29/893, 893.1–893.3, 29/893.35, 893.37, 447, 446; 403/273; 285/381.1; 219/117.1, 78; 74/640, 457, 460; 228/2.1, 112.1

(56) References Cited

U.S. PATENT DOCUMENTS

| | | | |
|---|---|---|---|
| 945,668 A | 1/1910 | Alford | |
| 1,157,666 A | 10/1915 | Bennett | |
| 1,347,671 A | * | 7/1920 | Belshaw ..................... 475/175 |
| 1,828,271 A | 10/1931 | Arnold | |
| 2,147,343 A | 2/1939 | Martin | |
| 2,279,955 A | 4/1942 | Sipe | |
| 3,133,344 A | 5/1964 | Keasler | |
| 3,239,699 A | * | 3/1966 | Ferrary ........................ 310/83 |
| 3,501,182 A | 3/1970 | Buchsbaum | |
| 4,023,613 A | 5/1977 | Uebayasi et al. | |
| 4,262,407 A | 4/1981 | Petersen et al. | |
| 4,376,333 A | 3/1983 | Kanamaru et al. | |
| 4,663,813 A | * | 5/1987 | Carlson ..................... 29/893.1 |

(Continued)

FOREIGN PATENT DOCUMENTS

| | | |
|---|---|---|
| CN | 1205951 A | 1/1999 |
| EP | 1110644 A1 | 6/2001 |
| GB | 2220595 A | 1/1990 |
| JP | 04322860 A | 11/1992 |
| JP | 2000154850 A | 6/2000 |
| JP | 2002340140 A | 11/2002 |
| SU | 1346382 A * | 10/1987 |

*Primary Examiner*—David P. Bryant
*Assistant Examiner*—Marc Jimenez
(74) *Attorney, Agent, or Firm*—Burns, Doane, Swecker & Mathis, L.L.P.

(57) ABSTRACT

A rigid internal gear 2 of the wave gear device is composed by integrating a tooth-forming ring 12 formed with internal teeth, and a main gear ring 11 into a single body. The tooth-forming ring 12 is manufactured from a ferrous or copper material that has superior strength and abrasion resistance, while the main gear ring 11 is manufactured from a lightweight material, such as an aluminum alloy. The outer circumferential surface of the tooth-forming ring 12 is aluminized to form a dispersed aluminum coating 15, before the tooth-forming ring 12 is cast within the main gear ring 11 so as to integrate the main gear ring 11 and the tooth-forming ring 12. Both parts are reliably integrated so that a large amount of torque can be transmitted, whereby realizing a rigid internal gear that is lighter than conventional models.

7 Claims, 7 Drawing Sheets

U.S. PATENT DOCUMENTS

| | | | |
|---|---|---|---|
| 4,692,294 A | | 9/1987 | Fisher et al. |
| 4,763,876 A | * | 8/1988 | Oda et al. .................. 251/359 |
| 5,003,685 A | | 4/1991 | Settles |
| 5,076,109 A | | 12/1991 | Isozumi |
| 5,348,210 A | * | 9/1994 | Linzell ....................... 228/115 |
| 5,497,548 A | | 3/1996 | Schlenger et al. |
| 5,519,182 A | * | 5/1996 | Linzell .................... 219/117.1 |
| 5,598,631 A | | 2/1997 | Umezawa et al. |
| 5,618,171 A | * | 4/1997 | von Behr et al. ........... 418/152 |
| 5,684,334 A | | 11/1997 | Zenmei et al. |
| 5,806,373 A | | 9/1998 | Parker |
| 5,918,508 A | | 7/1999 | Ishikawa |
| 6,023,990 A | | 2/2000 | Carr et al. |
| 6,058,794 A | | 5/2000 | Hempel |
| 6,082,222 A | * | 7/2000 | Kiyosawa et al. ............ 74/640 |
| 6,328,092 B1 | | 12/2001 | Geutlbauer et al. |
| 6,622,593 B2 | | 9/2003 | Kobayashi et al. |
| 6,638,390 B1 | | 10/2003 | Sizelove et al. |
| 6,647,827 B2 | | 11/2003 | Kobayashi |
| 2003/0079852 A1 | | 5/2003 | Rueckert et al. |

* cited by examiner (a)

(b)

(c)

(d)

METHOD OF MANUFACTURING A RIGID INTERNAL GEAR OF A WAVE GEAR DEVICE

This is an Division of Ser. No. 10/117,993 filed on Apr. 09, 2002 now abandoned.

BACKGROUND OF THE INVENTION

1. Field of the Invention

The present invention relates to a method of manufacturing a rigid internal gear of a wave gear device and to a rigid internal gear manufactured by this method of manufacturing. In more detail, the present invention pertains to a method of manufacturing a rigid internal gear that is made lighter with no loss in strength, abrasion resistance, etc., and to such a rigid internal gear.

2. Related Art

A typical wave gear device includes a circular rigid internal gear, a cup-shaped flexible external gear disposed inside the rigid internal gear, and a wave generator fitted into the flexible external gear. The wave generator normally has an elliptical outline, and the flexible external gear is flexed elliptically so that the flexible external teeth on its outer circumferential surface are partially meshed with the internal teeth of the rigid internal gear. When the wave generator is rotated by a motor or the like, the engaging portions of both gears move in a circumferential direction. Since there is a difference in the number of teeth between the external teeth and the internal teeth, relative rotation occurs between the gears in accordance with the difference in the number of teeth. Accordingly, if one of the gears is fixed, a reduced speed rotational output can be obtained from the other gear.

A wave gear device is characterized by having a low number of parts and by being lighter than other types of reduction gear. However, to achieve a further significant reduction in weight, it is necessary for the rigid internal gear of the wave gear device to make lighter. In more detail, a rigid internal gear needs to be strong and abrasion resistant, and so is manufactured using a heavy material such as a steel or copper material. As a result, the rigid internal gear accounts for a large proportion of the weight of the components of the wave gear device. In particular, in cases where an attachment flange for attaching a motor or an output-side member is integrally formed or a housing is integrally formed, the device becomes considerably heavy, so that the advantages of a wave gear device being lightweight are lost.

For the above reason, it is conceivable to use a ring made of a steel or copper material with high strength and abrasion resistance to form the part of the rigid internal gear in which the internal teeth are formed (i.e., the part for which strength and abrasion resistant are required), to use a ring made of a lightweight material such as an aluminum alloy to form the remaining main body of the gear, and to form the rigid internal gear by joining these rings to integrate them into a single component.

In the above case, it is necessary for the join between the main gear ring and the tooth-forming ring to transmit a large amount of torque, so that the join has to be dependably secured using fixings such as bolts. When the rings are joined in this way, it is necessary to manufacture the main gear ring and the tooth-forming ring as thick members, so that it is difficult to achieve weight reductions. Since the rings are attached using bolts or the like, there is also a corresponding increase in weight due to such fixings.

SUMMARY OF THE INVENTION

The present invention has a main object of providing a method of manufacturing a rigid internal gear made by integrating a tooth forming ring and a main gear ring, the tooth-forming ring composing only a part in which the internal teeth are formed and being formed of a material with superior strength and abrasion resistance and the main gear ring composing a remaining part and being formed of a lightweight material, the method being able to reliably integrate the two rings.

In order to solve the above and other objects, according to the present invention, there is proposed a method of manufacturing a rigid internal gear of a wave gear device, the rigid internal gear including a circular main gear ring and a circular tooth-forming ring that has internal teeth formed on an inner circumferential surface and being constructed by integrating the main gear ring and the tooth-forming ring with the tooth-forming ring on the inside of the main gear ring, the method including steps of: aluminizing an outer circumferential surface of the tooth-forming ring to form an aluminum-dispersed covering layer; and integrating the main gear ring and the tooth-forming ring by envelop-casting the tooth-forming ring within the main gear ring.

Here, it is preferable for fine concaves and convexes to be formed in the outer circumferential surface of the tooth-forming ring before the aluminizing step is performed since this makes it possible for a dispersed aluminum coating layer to be reliably formed on the outer circumferential surface.

It is also preferable for the tooth-forming ring to be envelop-cast within the main gear ring with the tooth-forming ring having first been heated to a temperature of at least 150° C., since this suppresses the occurrence of casting faults such as blow-holes and makes it possible to integrate the two members with a sufficiently high bonding strength.

Usually, the tooth-forming ring can be formed of ductile cast iron (such as FCD) that is highly abrasion resistant or austenitic spheroidal graphite iron (such as FCAD), while the main gear ring can be formed of one of aluminum, aluminum alloy, magnesium, and magnesium alloy.

In this case, the thickness of the bases of the teeth of the tooth-forming ring may be set in a range of 1 m to 5 m, where m is a module of the rigid internal gear.

Note that from the viewpoint of accuracy, it is preferable for the process that cuts the internal teeth in the tooth-forming ring to be performed after the tooth-forming ring has been integrated with the main gear ring.

The above and other objects can also be achieved by a method of manufacturing a rigid internal gear of a wave gear device, the rigid internal gear including a circular main gear ring and a circular tooth-forming ring that has internal teeth formed on an inner circumferential surface and being constructed by integrating the main gear ring and the tooth-forming ring with the tooth-forming ring on the inside of the main gear ring, the method including steps of: forming the main gear ring from a first material that has a low linear expansion coefficient; forming the tooth-forming ring from a second material that has a high linear expansion coefficient; and pressing the tooth-forming ring into an inside of the main gear ring and diffusion-combining the tooth-forming ring and the main gear ring.

As one example, when the first material is a titanium alloy with a linear expansion coefficient of approximately $8.8 \times 10^{-6}$, a ferrous material with a linear expansion coefficient of approximately $12.0 \times 10^{-6}$ may be used as the second material.

As another example, when the first material is a ceramic material with a linear expansion coefficient of approximately $7.8 \times 10^{-6}$, a stainless steel material with a linear expansion coefficient of approximately $17.0 \times 10^{-6}$ may be used as the second material.

As yet another example, when the first material is an aluminum alloy with a linear expansion coefficient in a range of $6.2 \times 10^{-6}$ to $10.0 \times 10^{-6}$, an aluminum alloy with a linear expansion coefficient in a range of $20 \times 10^{-6}$ to $24 \times 10^{-6}$ may be used as the second material.

With the method of manufacturing of the present invention, the pressure caused by the pressing in and the pressure caused by the difference in the linear expansion coefficients provide the pressing force at the bonding interface that is required for diffusion bonding. As a result, the two rings can be strongly integrated.

With the present invention, the pressing force that is generated at the bonding surface of the two rings when the tooth-forming ring is pressed in may be increased by making an inner circumferential surface of the main gear ring tapered, making an outer circumferential surface of the tooth-forming ring tapered so that the tooth-forming ring can be pressed into the tapered inner circumferential surface of the main gear ring, and pressing the tooth-forming ring into the inner circumferential surface of the main gear ring and diffusion-bonding the tooth-forming ring and the main gear ring together.

With the above method, the pressure that acts on the bonding surfaces of the rings during diffusion bonding can be increased, so that the two rings can be reliably bonded and integrated.

Note that it is preferable for the process that cuts the internal teeth in the tooth-forming ring to be performed after the tooth-forming ring has been integrated with the main gear ring, since this makes it possible to form the teeth accurately.

The above and other objects can also be achieved by a method of manufacturing a rigid internal gear of a wave gear device, the rigid internal gear including a main gear ring and a tooth-forming ring that has internal teeth formed on an inner circumferential surface and being constructed by integrating the main gear ring and the tooth-forming ring with the tooth-forming ring on the inside of the main gear ring, the method including steps of: adding knurls to an outer circumferential surface of the tooth-forming ring and carving, from tops of the knurls, at least one cutting edge that extends in a circumferential direction;

and pressing the tooth-forming ring into an inside of the main gear ring while having the at least one cutting edge formed in the outer circumferential surface of the tooth-forming ring cut an inner circumferential surface of the main gear ring so as to integrate the main gear ring and the tooth-forming ring.

Here, the main gear ring may be formed from one of an aluminum alloy, a titanium alloy, and a ceramic material, and the tooth-forming ring may be formed from one of a ferrous material and a copper material.

With the present invention, the tooth-forming ring cuts into the main gear ring as it is pressed into the main gear ring, so that the bonding strength of the rings can be increased.

Note that it is preferable for the process that cuts the internal teeth in the tooth-forming ring to be performed after the tooth-forming ring has been integrated with the main gear ring. By doing so, the internal teeth can be accurately formed.

DESCRIPTION OF THE PREFERRED EMBODIMENTS

The following describes, with reference to the attached drawings, several examples of wave gear devices that are equipped with rigid internal gears manufactured according to the present invention.

First Embodiment

Figure 1:
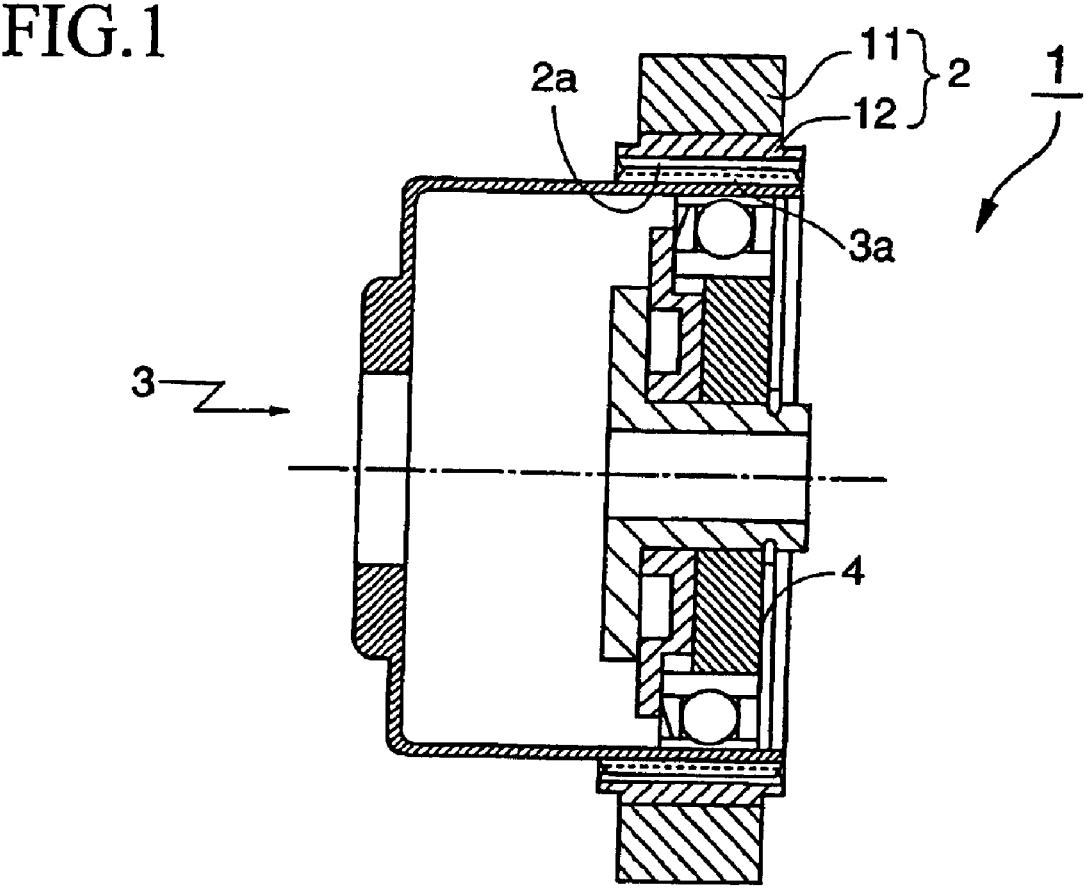
FIG. 1 is a schematic sectional view showing a wave gear device according to an embodiment of the present invention.
Figure 2:
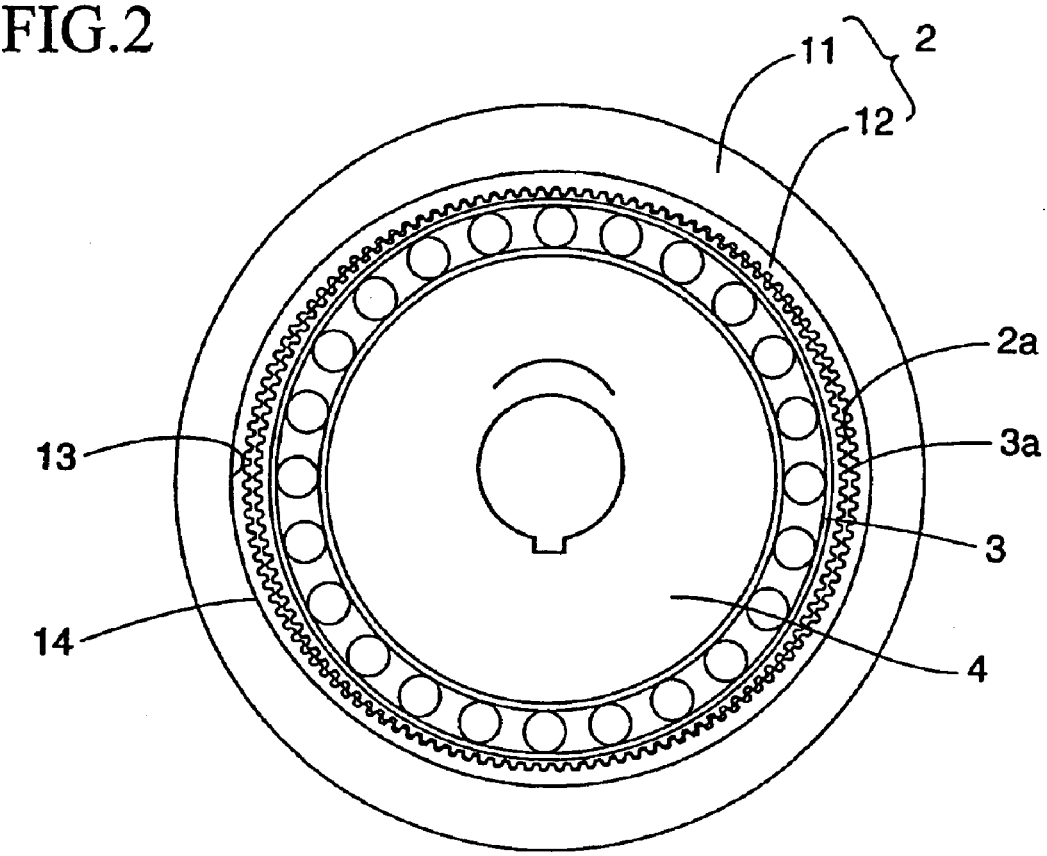
FIG. 2 is a schematic front view of the wave gear device of FIG. 1.

FIG. 1 is a schematic sectional view showing a wave gear device of the present embodiment, while FIG. 2 is a schematic front view of this wave gear device. As shown in these drawings, the wave gear device 1 of the present embodiment is composed of a circular rigid internal gear 2, a cup-shaped flexible external gear 3 disposed inside the rigid internal gear 2, and a wave generator 4 fitted into the flexible external gear 3. The wave generator 4 has an elliptical outline and flexes the flexible external gear 3 into an elliptical shape, so that external teeth 3a partially engage internal teeth 2a at both ends of the major axis of the elliptical shape. When the wave generator 4 is rotated by a high-speed rotational driving device such as a motor, the engaging portions of the gears 2 and 3 move in a circumferential direction. The difference in the number of teeth between the gears 2 and 3 is usually set at two, with this difference causing a relative rotation of the gears 2 and 3. Usually, the rigid internal gear 2 is fixed, so that a rotational output of significantly reduced speed is obtained from the flexible external gear 3.

The rigid internal gear 2 in the present embodiment is a composite gear that is composed of a circular main gear ring 11 and a tooth-forming ring 12 that has the internal teeth 3a formed on the inner circumferential surface. The tooth-forming ring 12 is attached to the circular inner circumferential surface 13 of the main gear ring 11 so as to integrate the two members.

Figure 3:
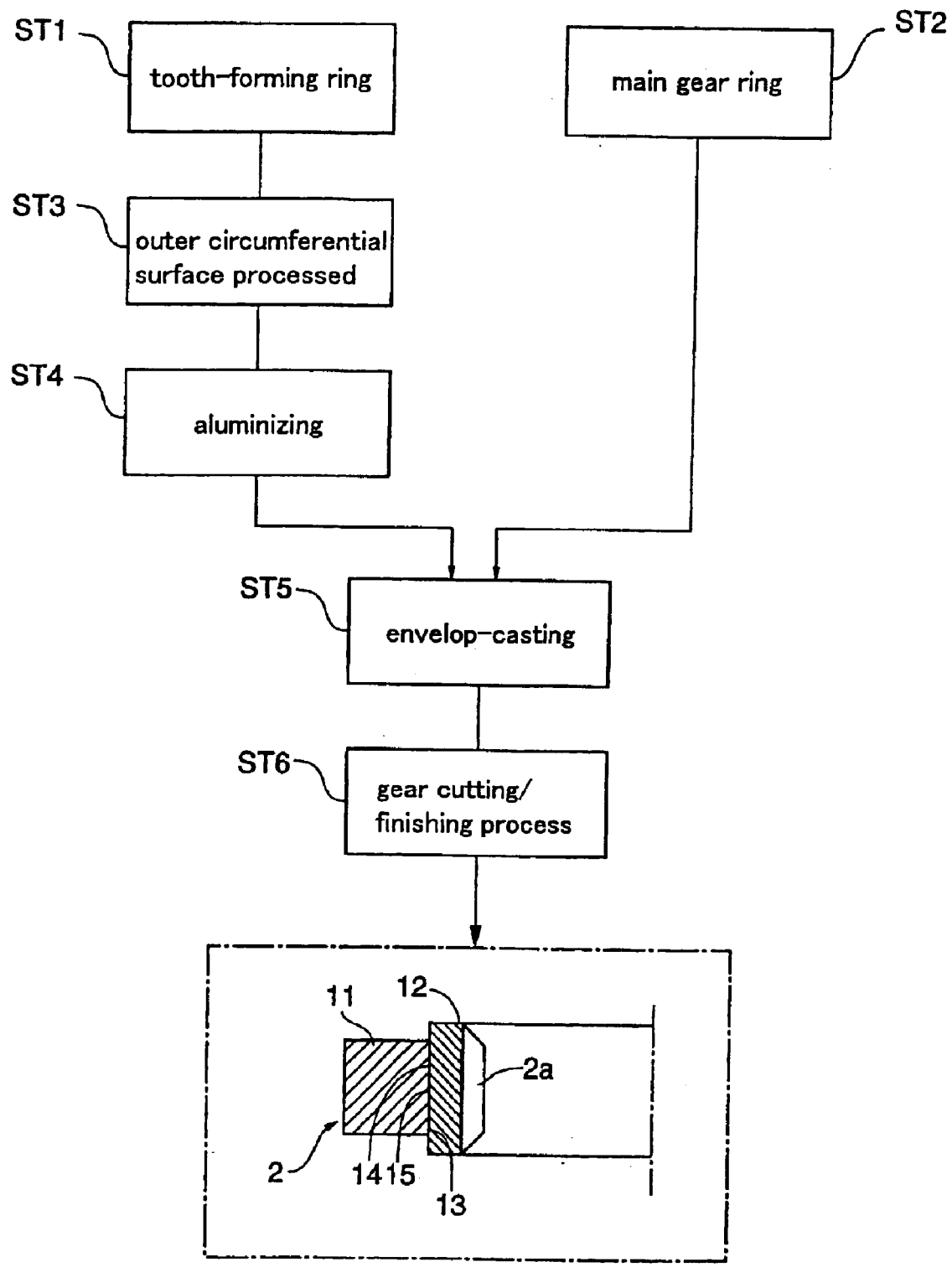
FIG. 3 is a general flowchart showing the method of manufacturing the rigid internal gear of the present wave gear device of FIG. 1.

FIG. 3 is a general flowchart showing the manufacturing process of the rigid internal gear 2 of the present embodiment. As shown in the drawing, a circular tooth-forming ring 12 in which the internal teeth 2a have not yet been formed and a main gear ring 11 are separately manufactured (steps ST1, ST2). In the present embodiment, the tooth-forming ring 12 is formed of ductile cast iron (such as FCD) that is highly abrasion resistant or austenitic spheroidal graphite iron (such as FCAD). The main gear ring 11 is formed of lightweight aluminum, magnesium, aluminum alloy, or magnesium alloy.

Next, a process for forming fine knurls or a fine screw thread is performed on an outer circumferential surface 14 of the tooth-forming ring 12 to form fine convexes and concaves in the outer circumferential surface 14 (step ST3). After this, the outer circumferential surface 14 is aluminized to form a dispersed aluminum coating 15.

Next, the tooth-forming ring 12 is envelop-cast inside the main gear ring 11 so as to integrate these parts into a single body (step ST5). When performing this enveloped casting, it is preferable to heat the tooth-forming ring 12 in advance to a temperature of 150° C. or higher so as to suppress the occurrence of enveloped-casting faults, such as blow-holes, and so integrate the two members with a sufficiently high bonding strength.

After the members have been integrated in this way, a gear-cutting process is performed on the inner circumferential surface of the tooth-forming ring 12 to form the internal teeth 2a and a finishing process is performed (step ST6), whereby the composite internal gear 2 is obtained. The thickness of the bottom of the tooth-forming ring 12 in which the internal teeth 2a are formed may be set in a range of 1 m to 5 m, where m is the module of the rigid internal gear 2.

As described above, the rigid internal gear 2 of the wave gear device of the present embodiment is composed of a tooth-forming ring 12, which has superior strength and abrasion resistance, and a lightweight main gear ring 11, with these parts being integrated into a single body in a way that makes it possible to reliably transmit a large amount of torque. Accordingly, it is possible to produce a rigid internal gear that is lighter than conventional gears but suffers from no loss in torque transmission characteristics, strength, abrasion resistance, etc.

Second Embodiment

The following describes a different method for attaching the tooth-forming ring 12 and the main gear ring 11.

Figure 4:
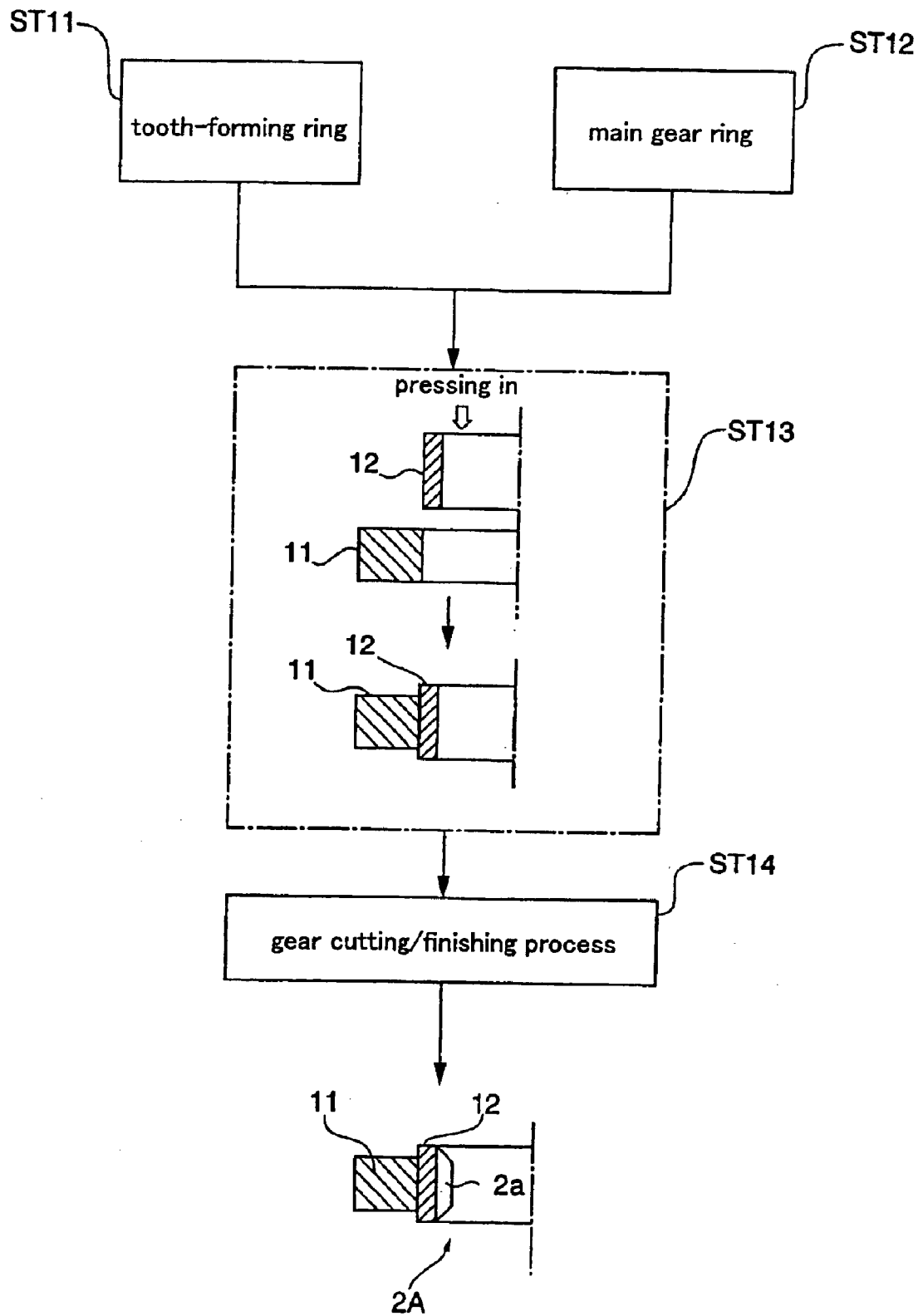
FIG. 4 is a general flowchart showing another embodiment of a method of manufacturing a rigid internal gear.

FIG. 4 is a general flowchart showing the manufacturing process of a composite rigid internal gear 2A of the present embodiment. As shown in the drawing, a tooth-forming ring 12 in which the internal teeth 2a have not been formed and a main gear ring 11 are separately manufactured (steps ST11, ST12). In the present embodiment, the tooth-forming ring 12 is formed of an abrasion-resistant and strong material, while the main gear ring 11 is formed of a lightweight material. Also, the materials are chosen so that the linear expansion coefficient of the tooth-forming ring 12 is larger than that of the main gear ring 11. Example combinations of the material and linear expansion coefficient of the tooth-forming ring 12 and those of the main gear ring 11 are shown below.

| Main gear ring 11 (linear expansion coefficient) | Tooth-forming ring 12 (linear expansion coefficient) |
| --- | --- |
| Titanium alloy ($8.8 \times 10^{-6}$) | Ferrous material ($12.0 \times 10^{-6}$) |
| Ceramic ($7.8 \times 10^{-6}$) | Stainless steel material ($17.0 \times 10^{-6}$) |
| Aluminum alloy ($6.2$ to $10.0 \times 10^{-6}$) | Aluminum alloy ($20$ to $24 \times 10^{-6}$) |

Next the main gear ring 11 and the tooth-forming ring 12 are diffusion-bonded together in a diffusion bonding furnace (step ST13). This is to say, inside a diffusion bonding furnace, the tooth-forming ring 12 is pressed into the inside of the main gear ring 11 using a preset pressure and the main gear ring 11 and the tooth-forming ring 12 are diffusion-bonded together.

After this, a gear-cutting process for forming the internal teeth 2a is applied to the inner circumferential surface of the tooth-forming ring 12 and a finishing process is applied (step ST14), whereby the rigid internal gear 2A is obtained that is comprised by the tooth-forming ring 12 and main gear ring 11 integrally connected with each other.

In order to increase the pressure that acts on the bonding surface of the main gear ring 11 and the tooth-forming ring 12 due to the application of force during the diffusion bonding, it is preferable for the rings to be manufactured in the following way.

Figure 5:
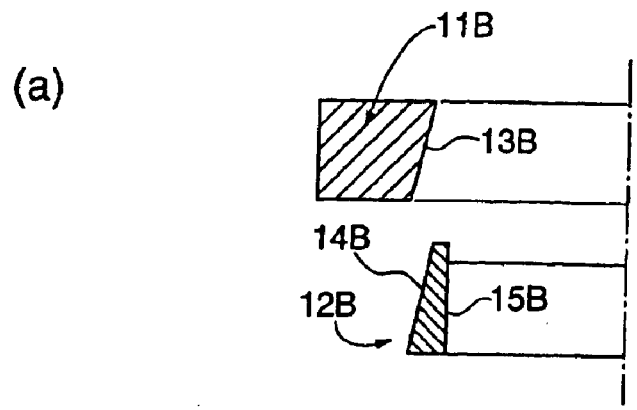
FIG. 5 is an explanatory view showing other examples of a tooth-forming ring and a main gear ring.
Figure 5:
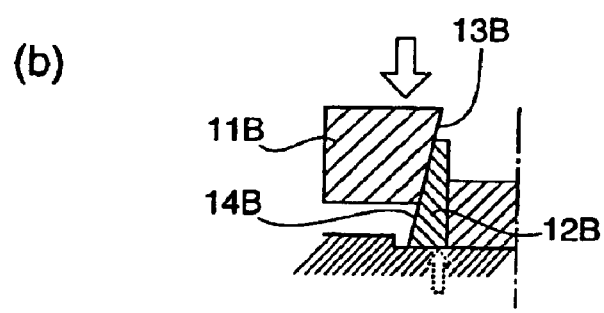
Figure 5:
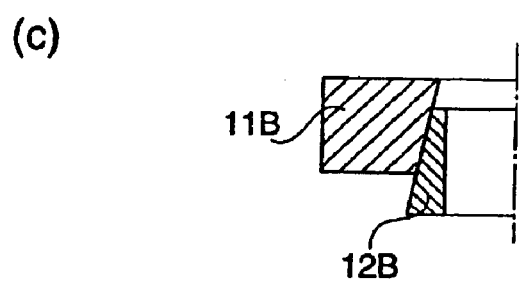
Figure 5:
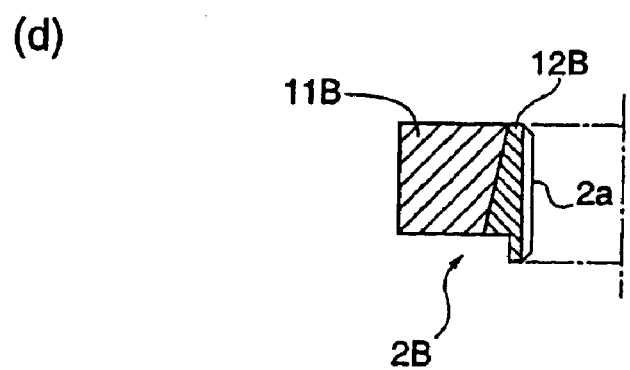

As shown in FIG. 5(a), an inner circumferential surface 13B of the main gear ring 11B is formed as a tapered inner circumferential surface. In the same way, an outer circumferential surface 14B of the tooth-forming ring 12B is formed as a tapered outer circumferential surface that complements the tapered inner circumferential surface. In view of the linear expansion coefficients of these two members 11B and 12B, as shown in FIG. 5(b) the dimensions of the members 11B and 12B are set so that it becomes possible for the tooth-forming ring 12B to fit only around halfway into the main gear ring 11B at the bonding temperature used in the diffusion bonding furnace. In the state shown in FIG. 5(b), pressure is applied from above as shown by the arrow drawn using a solid line or from below as shown by the arrow drawing using a broken line, so that the tooth-forming ring 12B is pressed into the inside of the main gear ring 11B, with the members 11B and 12B being diffusion-bonded together in the state shown in FIG. 5(c). After this, a gear-cutting process is performed on the inner circumferential surface 15B of the tooth-forming ring 12B to form the internal teeth 2a and a finishing process is performed, resulting in the rigid internal gear 2B shown in FIG. 5(d) being obtained.

As one example, when the main gear ring 11B is formed of a 2000 series Al—Cu—Mg alloy (such as A2017)and the tooth-forming ring 12B is formed of ductile iron, it was confirmed that a favorable bonded state is achieved by setting the bonding temperature used in the diffusion bonding furnace in a range of 400 to 600° C. and the bonding pressure at 2 to 15 MPa.

As described above, the rigid internal gears 2A and 2B of a wave gear device according to the present embodiment are each formed of a tooth-forming ring that has superior strength and abrasion resistance and a lightweight main gear ring, the tooth-forming ring 12 disposed inside has a higher linear expansion coefficient, and the two members are integrated by diffusion bonding.

Accordingly, the tooth-forming ring 12 and the main gear ring 11 are diffusion-bonded together with a sufficient bonding force, so that the two members are strongly integrated. This makes it possible for a large amount of torque to be reliably transmitted.

In particular, it is also preferable for the bonded surfaces of both members to be formed as tapered surfaces. By doing so, the bonding pressure can be made even stronger, making it possible to join the rings together even more strongly.

Third Embodiment

Figure 6:
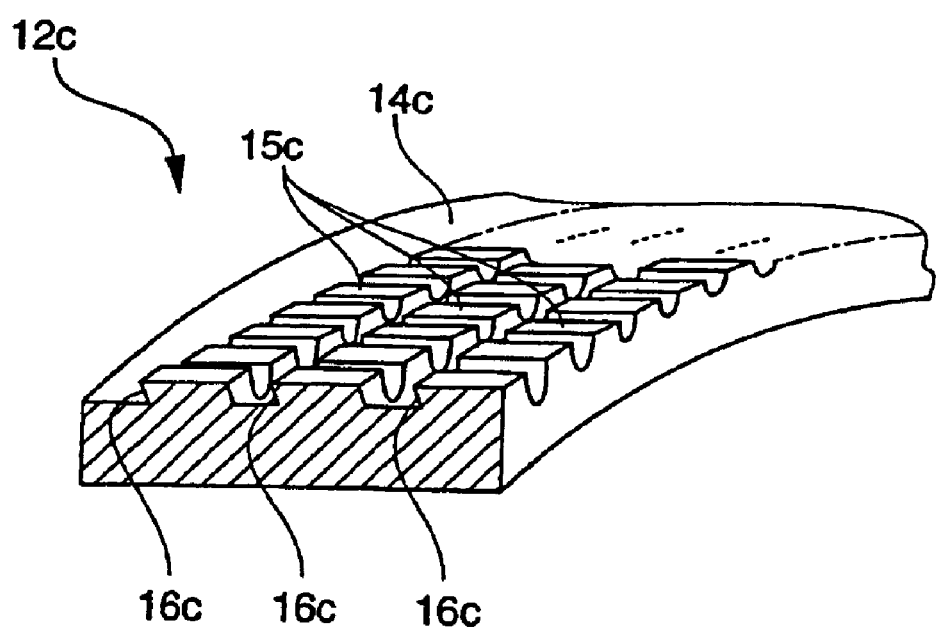
FIG. 6 is an explanatory view showing one part of the outer circumferential surface of a tooth-forming ring that is used in yet another embodiment of a method of manufacturing a rigid internal gear.
Figure 7:
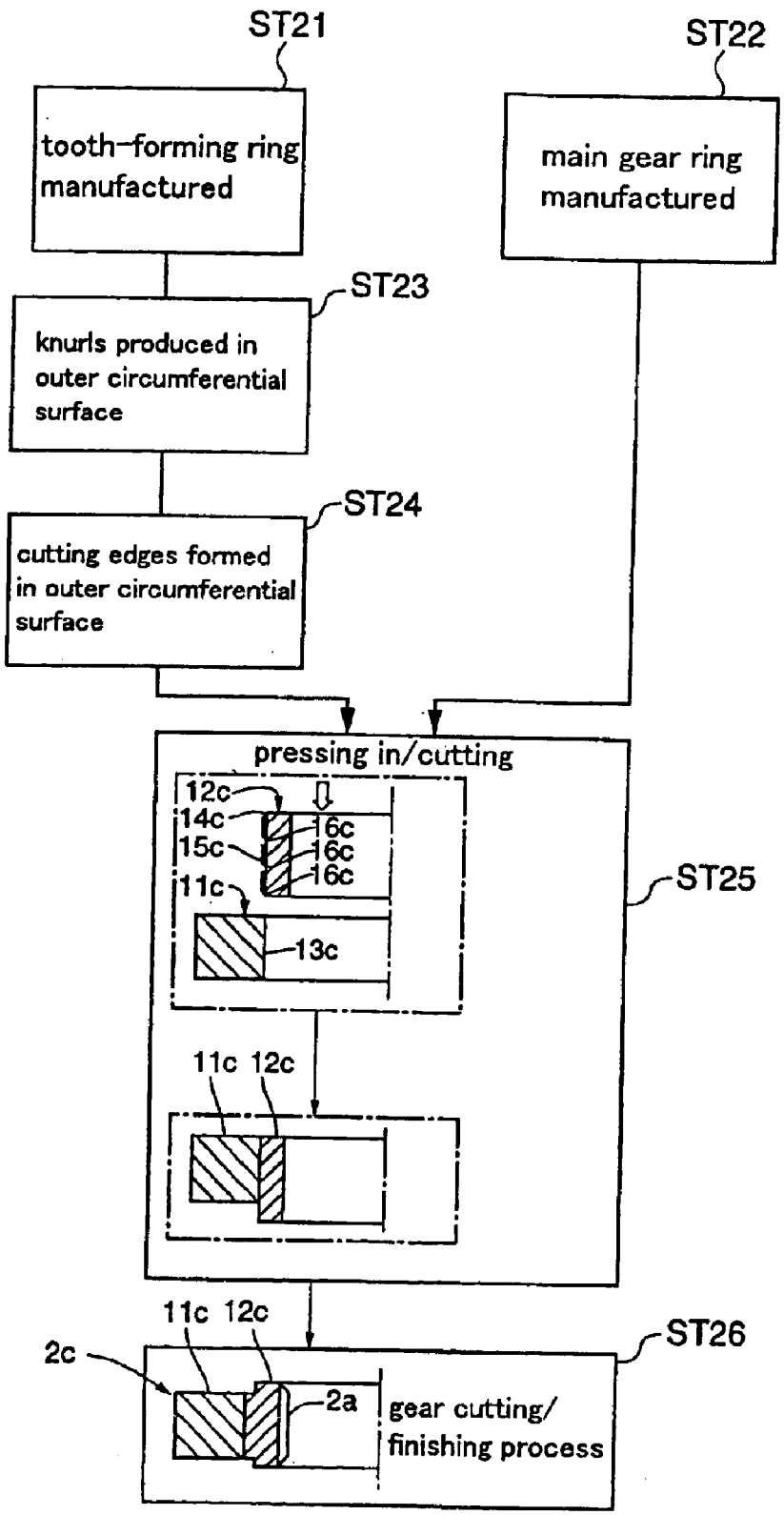
FIG. 7 is a general flowchart showing a method of manufacturing a rigid internal gear using the tooth-forming ring of FIG. 6.

The following describes a different method for attaching the tooth-forming ring and the main gear ring, with reference to FIGS. 6 and 7.

FIG. 6 is an explanatory view of part of an outer circumferential surface of the tooth-forming ring 12C used in the bonding method of the present embodiment, and FIG. 7 is a general flowchart showing the manufacturing process of a composite rigid internal gear 2C of the present embodiment. The following describes the manufacturing process of the combined rigid internal gear 2C of the present embodiment, with reference to these drawings.

First, a tooth-forming ring 12C in which the internal teeth 2a have not been formed is manufactured from a ferrous material that is strong and abrasion-resistant (step ST21 in FIG. 7). Also, the main gear ring 11C is manufactured from a lightweight aluminum alloy (step ST22 in FIG. 7).

Next, a knurling process is performed on the outer circumferential surface 14C of the tooth-forming ring 12C to form knurls 15C (step ST23 in FIG. 7, see FIG. 6). These knurls may be formed with a pitch of 0.5 to 1.6 mm. One or a plurality, such as three, of cutting edges 16C that extend in the circumferential direction are carved out from above these knurls 15C (step ST24 in FIG. 7, see FIG. 6).

After this, the tooth-forming ring 12C is pressed into the inside of the main gear ring 11C. The interference for this pressing may be set between 0.03 and around 0.3 mm. During pressing, the tooth-forming ring 12C is pressed in with the cutting edges 16C formed in the outer circumferential surface 14C of the tooth-forming ring 12C cutting the inner circumferential surface 13C of the main gear ring 11C. As a result, the two rings 11C and 12C are strongly joined together.

Finally, a gear-cutting process is performed on the inner circumferential surface of the tooth-forming ring 12C to form the internal teeth 2a and a finishing process is performed, resulting in the composite rigid internal gear 2C being obtained.

As described above, with the method of the present embodiment, cutting edges that extend in the circumferential direction are formed in the outer circumferential surface of the toot-forming ring in addition to the knurls, this tooth-forming ring is pressed into the inside of the main gear ring, and the two rings are joined so as to integrate them into a single body. Accordingly, when the tooth-forming ring is pressed in, the inner circumferential surface of the main gear ring is cut by the cutting edges that are formed are in the outer circumferential surface of the tooth-forming ring as the tooth-forming ring is pressed into the inside of the main gear ring. Consequently, the two rings are strongly joined together.

According to the method of manufacturing a rigid internal gear of a wave gear device of the present invention, the rigid internal gear is composed of a main gear ring formed of a lightweight material and a tooth-forming ring formed of a strong and abrasion-resistant material, with these rings being strongly joined together. Hence, the rigid internal gear can be made lighter without restricting the torque transmission characteristics of the rigid internal gear.

Also, by using a rigid internal gear manufactured according to the method of the present invention, a lightweight wave gear device with favorable torque transmission characteristics can be realized.

What is claimed is:

1. A method of manufacturing a rigid internal gear of a wave gear device, in which the rigid internal gear comprises a main gear ring and a tooth-forming ring having internal teeth formed on an inner circumferential surface thereof and, in which the tooth-forming ring is disclosed inside the main gear body and integrally bonded thereto, the method comprising steps of:

forming the main gear ring from a first material that has a first linear expansion coefficient;

forming the tooth-forming ring from a second material that has a second linear expansion coefficient; and pressing the tooth-forming ring into an inside of the main gear ring and diffusion-combining the tooth-forming ring and the main gear ring;

wherein the first linear expansion coefficient is lower than the second linear expansion coefficient.

2. A method of manufacturing a rigid internal gear according to claim 1, wherein the first material is a titanium alloy with a linear expansion coefficient of approximately $8.8 \times 10^{-6}$, and the second material is a ferrous material with a linear expansion coefficient of approximately $12.0 \times 10^{-6}$.

3. A method of manufacturing a rigid internal gear according to claim 1, wherein the first material is a ceramic material with a linear expansion coefficient of approximately $7.8 \times 10^{-6}$, and the second material is a stainless steel material with a linear expansion coefficient of approximately $17.0 \times 10^{-6}$.

4. A method of manufacturing a rigid internal gear according to claim 1, wherein the first material is an aluminum alloy with a linear expansion coefficient in a range of $6.2 \times 10^{-6}$ to $10.0 \times 10^{-6}$, and the second material is an aluminum alloy with a linear expansion coefficient in a range of $20 \times 10^{-6}$ to $24 \times 10^{-6}$.

5. A method of manufacturing a rigid internal gear according to claim 1, wherein an inner circumferential surface of the main gear ring is tapered, an outer circumferential surface of the tooth-forming ring is tapered that the tooth-forming ring can be pressed into the tapered inner circumferential surface of the main gear ring, and the tooth-forming ring is pressed onto the inner circumferential surface of the main gear ring and the tooth-forming ring and main gear ring are diffusion-bonded together.

6. A method of manufacturing a rigid internal gear according to claim 1, wherein a gear cutting process for forming the internal teeth on the tooth-forming ring is performed after the tooth-forming ring has been joined to the main gear ring to form a single body.

7. A rigid internal gear of a wave gear device manufactured by a method of manufacturing according to claim 1.

* * * * *